United States Patent
Tomoda

(10) Patent No.: US 8,278,377 B2
(45) Date of Patent: Oct. 2, 2012

(54) FLAME RETARDANT POLYCARBONATE RESIN COMPOSITION

(75) Inventor: Takuya Tomoda, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 12/994,795

(22) PCT Filed: May 26, 2009

(86) PCT No.: PCT/JP2009/059939
§ 371 (c)(1),
(2), (4) Date: Nov. 26, 2010

(87) PCT Pub. No.: WO2009/145340
PCT Pub. Date: Dec. 3, 2009

(65) Prior Publication Data
US 2011/0077332 A1    Mar. 31, 2011

(30) Foreign Application Priority Data
May 26, 2008   (JP) ................. 2008-136561

(51) Int. Cl.
*C08K 5/5419* (2006.01)
*C08K 5/42* (2006.01)
*C08G 64/06* (2006.01)

(52) U.S. Cl. .......... 524/165; 525/67; 525/101; 525/133; 525/148; 525/276; 524/269; 523/201

(58) Field of Classification Search ............. 524/165, 524/269; 523/201; 525/67, 101, 133, 148, 525/276, 285
See application file for complete search history.

(56) References Cited

U.S. PATENT DOCUMENTS

| | | | | |
|---|---|---|---|---|
| 4,569,969 A * | 2/1986 | Jones et al. | ............. | 525/67 |
| 4,766,165 A * | 8/1988 | Kress et al. | ............. | 524/140 |
| 6,613,824 B2 * | 9/2003 | Campbell et al. | ............. | 524/127 |
| 2006/0142455 A1 * | 6/2006 | Agarwal et al. | ............. | 524/423 |
| 2007/0282031 A1 * | 12/2007 | Lehmann et al. | ............. | 522/3 |
| 2008/0275188 A1 * | 11/2008 | Park | ............. | 525/199 |
| 2010/0113660 A1 * | 5/2010 | Tomoda et al. | ............. | 524/165 |

FOREIGN PATENT DOCUMENTS

| | | | |
|---|---|---|---|
| CN | 1872899 A | * | 12/2006 |
| CN | 101165082 A | * | 4/2008 |
| GB | 2332203 A | * | 6/1999 |
| JP | 3066012 | | 5/2000 |
| JP | 2000-297220 | | 10/2000 |
| JP | 3469391 | | 9/2003 |
| JP | 2005-263908 | | 9/2005 |
| WO | WO 2008016157 A1 | * | 2/2008 |

OTHER PUBLICATIONS

Machine translated English equivalent of CN 1872899, Dec. 2006, 9 pages.*
Machine translated English equivalent of CN 101165082, Apr. 2008, 10 pages.*
International Search Report issued Aug. 18, 2009 in corresponding International (PCT) Application No. PCT/JP2009/059939, of record.
International Preliminary Report on Patentability with English translation of the Written Opinion issued Jan. 20, 2011 in corresponding International (PCT) Application No. PCT/JP2009/059939.

* cited by examiner

*Primary Examiner* — Ling Choi
*Assistant Examiner* — Brieann R Fink
(74) *Attorney, Agent, or Firm* — Wenderoth, Lind & Ponack, L.L.P.

(57) ABSTRACT

A resin composition which is excellent in appearance, impact strength, hydrolysis resistance and drip prevention properties. The resin composition comprises (A) 100 parts by weight of an aromatic polycarbonate resin (component A), (B) 0.01 to 6 parts by weight of a polymer mixture (component B) obtained by suspension polymerizing a styrene monomer, a maleic anhydride monomer and an acrylic monomer in the presence of polytetrafluoroethylene particles, and (C) 0.01 to 30 parts by weight of a flame retardant (component C).

15 Claims, No Drawings

FLAME RETARDANT POLYCARBONATE RESIN COMPOSITION

CROSS-REFERENCE TO RELATED APPLICATIONS

This application is a 35 U.S.C. 371 National Stage entry of PCT Application Ser. No. PCT/JP2009/059939 filed on May 26, 2009, which claims foreign priority benefit of Japanese Patent Application No. JP 2005-136561, filed May 26, 2008, the contents of which are hereby incorporated by reference.

TECHNICAL FIELD

The present invention relates to a resin composition comprising a polycarbonate resin. More specifically, it relates to a resin composition which provides a molded article having a good appearance and excellent impact strength, flame retardancy and hydrolysis resistance as well as excellent drip prevention properties.

BACKGROUND ART

An aromatic polycarbonate resin has excellent transparency, flame retardancy, heat resistance and strength and is therefore used in a wide variety of fields. However, as electronic and electric equipment parts and OA-related parts are becoming thinner, there is a case where the flame retardancy of the aromatic polycarbonate resin is not satisfactory. In addition, high flame retardancy rated UL (standards of Underwriters Laboratories of the U.S.) 94 V-0 is now often required for the aromatic polycarbonate resin, thereby limiting the application of the aromatic polycarbonate resin. To obtain high flame retardancy, it is important that the dripping of the resin should not occur when it is burnt.

It is known that polytetrafluoroethylene is added to suppress the dripping of the aromatic polycarbonate resin. However, as the secondary agglomeration of polytetrafluoroethylene readily occurs due to the influence of static electricity, when it is mixed with a polycarbonate resin, a feed failure to the cylinder of an extruder is apt to occur. Owing to its dispersion failure, it deteriorates appearance and impact strength. To improve the dispersibility of polytetrafluoroethylene, there are proposed various methods for mixing polytetrafluoroethylene with an organic polymer (refer to Patent Documents 1 to 4).

Meanwhile, design quality including a sensory part is now required for OA-related parts. Although a drip preventing effect is easily obtained when polytetrafluoroethylene is added, transparency lowers. The reduction of transparency degrades light transmittance and causes such inconvenience as the reduction of design width such as coloring including a sensory part. When viewed from the opposite side, it can be said that a material retaining transparency, that is, a material which provides a molded article having low haze (a material having high transparency) has a large design width including a sensory part. Stated more specifically, a transparent color (generally called "skeleton color") can be given to a material having low haze by using a dye-based colorant, and a translucent color and an opaque color can also be given to the above material by using a pigment-based colorant alone or in combination with the above dye-based colorant. Further, light diffusability can be obtained by adding a light diffusing agent, and a target level of light diffusability can also be provided by controlling the amount of the light diffusing agent. Therefore, the reduction of transparency, that is, the reduction of light transmittance makes it difficult to color a transparent color, thereby reducing the design width associated with coloration including a sensory part and further the provision of light diffusability. Consequently, to expand the design width, satisfactory drip prevention properties must be provided even when the amount of polytetrafluoroethylene is small.

At the same time, excellent hydrolysis resistance is also required to enhance the durabilities of electronic and electric equipment parts and products. To this end, a flame retardant resin composition which has a good appearance due to the improvement of the dispersibility of polytetrafluoroethylene into a resin, high impact resistance, excellent hydrolysis resistance and high drip prevention properties is desired.

Patent Document 1 has a description of the improvement of dispersibility by mixing polytetrafluoroethylene and an organic polymer into a resin but it cannot be said that the disclosed resin composition is satisfactory in terms of hydrolysis resistance. Although the dispersibility of polytetrafluoroethylene is improved by the same method in Patent Documents 2 to 4, it cannot be said that the disclosed resin compositions are satisfactory in terms of hydrolysis resistance and drip prevention properties as well as impact strength. Therefore, it cannot be said that the above prior arts disclose the means of solving the above technical problems completely.

It is known that phosphorus-based, phenol-based and sulfur-based heat stabilizers are effective in the improvement of the heat stability of a polycarbonate resin composition. However, the addition of these heat stabilizers greatly deteriorates hydrolysis resistance.

(Patent Document 1) Japanese Patent No. 3469391
(Patent Document 2) JP-A 2000-297220
(Patent Document 3) Japanese Patent No. 3066012
(Patent Document 4) JP-A 2005-263908

DISCLOSURE OF THE INVENTION

It is an object of the present invention to provide a resin composition which comprises a polycarbonate resin and provides a molded article having a good appearance and excellent impact strength, flame retardancy and hydrolysis resistance as well as high drip prevention properties. It is another object of the present invention to provide a method of producing the resin composition. It is still another object of the present invention to provide a method of improving the impact strength and hydrolysis resistance of a resin composition comprising a polycarbonate resin.

The inventors have conducted intensive studies to attain the above objects and have found that, when a polymer mixer obtained by suspension polymerizing specific monomers in the presence of polytetrafluoroethylene particles and a flame retardant are mixed with a polycarbonate resin, a resin composition which provides a molded article having a good appearance and excellent impact strength, flame retardancy, hydrolysis resistance and drip prevention properties is obtained. The present invention has been accomplished based on this finding.

The present invention includes the following inventions.
1. A resin composition comprising (A) 100 parts by weight of an aromatic polycarbonate resin (component A), (B) 0.01 to 6 parts by weight of a polymer mixture obtained by suspension polymerizing a styrene monomer, a maleic anhydride monomer and an acrylic monomer in the presence of polytetrafluoroethylene particles (component B), and (C) 0.01 to 30 parts by weight of a flame retardant (component C).

2. The resin composition in the above paragraph 1, wherein a recurring unit derived from the styrene monomer of the component B has a structure represented by the following formula (1):

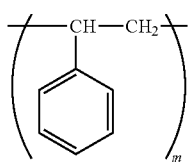

(1)

(in the formula (1), m is an integer of 1 to 2,000).

3. The resin composition in the above paragraph 1 or 2, wherein a recurring unit derived from the maleic anhydride monomer of the component B has a structure represented by the following formula (2):

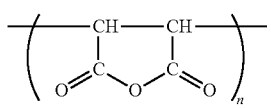

(2)

(in the formula (2), n is an integer of 1 to 2,000).

4. The resin composition in any one of the above paragraphs 1 to 3, wherein a recurring unit derived from the acrylic monomer of the component B has a structure represented by the following formula (3):

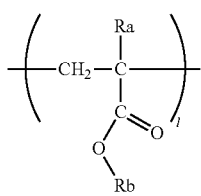

(3)

(in the formula (3), Ra is a hydrogen atom or alkyl group having 1 to 3 carbon atoms, Rb is a hydrogen atom or alkyl group having 1 to 3 carbon atoms, and l is an integer of 1 to 2,000).

5. The resin composition in the above paragraph 4, wherein the recurring unit derived from the acrylic monomer of the component B has a structure represented by the following formula (3-1):

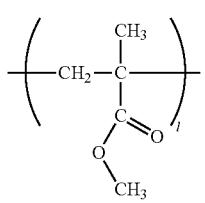

(3-1)

(in the formula (3-1), l is an integer of 1 to 2,000).

6. The resin composition in any one of the above paragraphs 1 to 5, wherein the content of a sodium metal ion (excluding a sodium metal ion contained in polytetrafluoroethylene) in the component B is not more than 10 ppm.

7. The resin composition in any one of the above paragraphs 1 to 6, wherein the component C is at least one flame retardant selected from the group consisting of an organic metal salt-based flame retardant and a silicone-based flame retardant.

8. The resin composition in the above paragraph 7, wherein the organic metal salt-based flame retardant is an organic sulfonic acid alkali (earth) metal salt.

9. The resin composition in the above paragraph 8, wherein the organic sulfonic acid alkali (earth) metal salt is a perfluoroalkylsulfonic acid alkali (earth) metal salt.

10. The resin composition in the above paragraph 7, wherein the silicone-based flame retardant is a silicone compound having an Si—H group and an aromatic group in the molecule, (i) the content of the Si—H group (the amount of Si—H) is 0.1 to 1.2 mol/100 g, (ii) the content of the aromatic group represented by the following formula (4) (the amount of the aromatic group) is 10 to 70 wt %, and (iii) the average polymerization degree is 3 to 150:

(4)

(in the formula (4), X's are each independently an OH group or hydrocarbon group having 1 to 20 carbon atoms which may have a heteroatom-containing functional group, and n is an integer of 0 to 5, with the proviso that when n is 2 or more in the formula (4), X's may be different from one another).

11. The resin composition in the above paragraph 7, wherein the silicone-based flame retardant satisfies all of the following relational expressions when it has siloxane units M, $M^H$, D, $D^H$, $D^{\Phi 2}$, T and $T^\Phi$ (M: $(CH_3)_3SiO_{1/2}$, $M^H$: $H(CH_3)_2SiO_{1/2}$, D: $(CH_3)_2SiO$, $D^H$: $H(CH_3)$ SiO, $D^{\Phi 2}$: $(C_6H_5)_2SiO$, T: $(CH_3)SiO_{3/2}$, $T^\Phi$: $(C_6H_5)SiO_{3/2}$) and the average numbers of siloxane units per molecule are represented by m, $m_h$, d, $d_h$, $d_{p2}$, t and $t_p$, respectively:

$2 \leq m + m_h \leq 40$ $0.35 \leq d + d_h + d_{p2} \leq 148$ $0 \leq t + t_p \leq 38$ $0.35 \leq m_h + d_h \leq 110$.

12. The resin composition in any one of the above paragraphs 1 to 11 which comprises (D) 1 to 50 parts by weight of a thermoplastic resin except for the aromatic polycarbonate resin (component D) based on 100 parts by weight of the component A.

13. The resin composition in the above paragraph 12, wherein the component D is a polyester resin and/or ABS resin.

14. A molded article obtained from the resin composition of any one of the above paragraphs 1 to 13.

15. A method of producing a resin composition, comprising mixing together (A) 100 parts by weight of an aromatic polycarbonate resin (component A), (B) 0.01 to 6 parts by weight of a polymer mixture obtained by suspension polymerizing a styrene monomer, a maleic anhydride monomer and an acrylic monomer in the presence of polytetrafluoroethylene particles (component B), and (C) 0.01 to 30 parts by weight of a flame retardant (component C).

16. A method of improving the impact strength of a molded article of a resin composition comprising an aromatic polycarbonate resin, polytetrafluoroethylene particles and a flame retardant, wherein a polymer mixture obtained by suspension polymerizing a styrene monomer, a maleic anhydride monomer and an acrylic monomer in the presence of polytetrafluoroethylene particles is used as the polytetrafluoroethylene particles.

The resin composition of the present invention has a good appearance and excellent impact strength, flame retardancy, hydrolysis resistance and drip prevention properties all of which could not be obtained in the prior art.

BEST MODE FOR CARRYING OUT THE INVENTION

The present invention will be described in detail hereinunder.

(Component A: Aromatic Polycarbonate Resin)

The aromatic polycarbonate resin which is used as the component A in the present invention is obtained by reacting a dihydric phenol with a carbonate precursor. Examples of the reaction include interfacial polycondensation, melt transesterification, the solid-phase transesterification of a carbonate prepolymer and the ring-opening polymerization of a cyclic carbonate compound.

Typical examples of the dihydric phenol used herein include hydroquinone, resorcinol, 4,4'-biphenol, 1,1-bis(4-hydroxyphenyl)ethane, 2,2-bis(4-hydroxyphenyl)propane (commonly known as "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl)fluorene. Out of these, bis(4-hydroxyphenyl)alkanes are preferred dihydric phenols, and bisphenol A is particularly preferred from the viewpoint of impact resistance.

In the present invention, a special polycarbonate which is produced by using another dihydric phenol may be used as the component A, besides bisphenol A-based polycarbonates which are general-purpose polycarbonates.

For example, polycarbonates (homopolymers or copolymers) obtained by using 4,4'-(m-phenylenediisopropylidene)diphenol (may be abbreviated as "BPM" hereinafter), 1,1-bis(4-hydroxyphenyl)cyclohexane, 1,1-bis(4-hydroxyphenyl)-3,3,5-trimethylcyclohexane (may be abbreviated as "Bis-TMC" hereinafter), 9,9-bis(4-hydroxyphenyl)fluorene or 9,9-bis(4-hydroxy-3-methylphenyl)fluorene (may be abbreviated as "BCF" hereinafter) as part or all of the dihydric phenol component are suitable for use in fields in which the requirements for stability to dimensional change by water absorption and form stability are very strict. These dihydric phenols except BPA are used in an amount of preferably not less than 5 mol %, particularly preferably not less than 10 mol % of the whole dihydric phenol component constituting the polycarbonate.

Particularly when high stiffness and excellent hydrolysis resistance are required, the component A constituting the resin composition is particularly preferably one of the following copolycarbonates (1) to (3).

(1) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of BCF based on 100 mol % of the dihydric phenol component constituting the polycarbonate.

(2) A copolycarbonate which comprises 10 to 95 mol % (preferably 50 to 90 mol %, more preferably 60 to 85 mol %) of BPA and 5 to 90 mol % (preferably 10 to 50 mol %, more preferably 15 to 40 mol %) of BCF based on 100 mol % of the dihydric phenol component constituting the polycarbonate.

(3) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of Bis-TMC based on 100 mol % of the dihydric phenol component constituting the polycarbonate.

These special polycarbonates may be used alone or in combination of two or more. They may be mixed with a commonly used bisphenol A type polycarbonate.

The production processes and characteristic properties of these special polycarbonates are detailed in, for example, JP-A 6-172508, JP-A 8-27370, JP-A 2001-55435 and JP-A 2002-117580.

Out of the above polycarbonates, polycarbonates whose water absorption coefficient and Tg (glass transition temperature) have been adjusted to the following ranges by controlling their compositions are excellent in the hydrolysis resistance of the polymer itself and rarely warp after molding. Therefore, they are particularly preferred in fields in which form stability is required.

(i) Polycarbonates having a water absorption coefficient of 0.05 to 0.15%, preferably 0.06 to 0.13% and a Tg of 120 to 180° C., or (ii) polycarbonates having a Tg of 160 to 250° C., preferably 170 to 230° C. and a water absorption coefficient of 0.10 to 0.30%, preferably 0.13 to 0.30%, more preferably 0.14 to 0.27%.

The water absorption coefficient of a polycarbonate is a value obtained by measuring the moisture content of a disk-like test specimen having a diameter of 45 mm and a thickness of 3.0 mm after the specimen is immersed in 23° C. water for 24 hours in accordance with ISO62-1980. Tg (glass transition temperature) is a value measured with a differential scanning calorimeter (DSC) in accordance with JIS K7121.

The carbonate precursor is a carbonyl halide, diester carbonate or haloformate, as exemplified by phosgene, diphenyl carbonate and dihaloformates of a dihydric phenol.

For the manufacture of an aromatic polycarbonate resin from a dihydric phenol and a carbonate precursor by interfacial polymerization, a catalyst, a terminal capping agent and an antioxidant for preventing the oxidation of the dihydric phenol may be optionally used. The aromatic polycarbonate resin includes a branched polycarbonate resin obtained by copolymerizing a polyfunctional aromatic compound having 3 or more functional groups, a polyester carbonate resin obtained by copolymerizing an aromatic or aliphatic (including alicyclic) bifunctional carboxylic acid, a copolycarbonate resin obtained by copolymerizing a bifunctional alcohol (including an alicyclic bifunctional alcohol), and a polyester carbonate resin obtained by copolymerizing the bifunctional carboxylic acid and the bifunctional alcohol. It may also be a mixture of two or more of the obtained aromatic polycarbonate resins.

The branched polycarbonate resin can provide drip prevention properties to the resin composition of the present invention. Examples of the polyfunctional aromatic compound having 3 or more functional groups used in the branched polycarbonate resin include phloroglucin, phloroglucide, trisphenols such as 4,6-dimethyl-2,4,6-tris(4-hydroxydiphenyl)heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenone tetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The amount of the constituent unit derived from the polyfunctional aromatic compound in the branched polycarbonate is preferably 0.01 to 1 mol %, more preferably 0.05 to 0.9 mol %, much more preferably 0.05 to 0.8 mol % based on 100 mol % of the total of the constituent unit derived from the dihydric phenol and the constituent unit derived from the polyfunctional aromatic compound.

In the case of the melt transesterification process, a branched structure unit may be produced as a side reaction. The amount of the branched structure unit is preferably 0.001 to 1 mol %, more preferably 0.005 to 0.9 mol %, much more preferably 0.01 to 0.8 mol % based on 100 mol % of the total of it and the constituent unit derived from the dihydric phenol. The amount of the branched structure can be calculated by $^1$H-NMR measurement.

The aliphatic bifunctional carboxylic acid is preferably α,ω-dicarboxylic acid. Preferred examples of the aliphatic bifunctional carboxylic acid include linear saturated aliphatic dicarboxylic acids such as sebacic acid (decanedioic acid), dodecanedioic acid, tetradecanedioic acid, octadecanedioic acid and icosanedioic acid, and alicyclic dicarboxylic acids such as cyclohexanedicarboxylic acid. The bifunctional alcohol is preferably an alicyclic diol such as cyclohexanedimethanol, cyclohexanediol or tricyclodecanedimethanol. Further, a polycarbonate-polyorganosiloxane copolymer obtained by copolymerizing a polyorganosiloxane unit may also be used.

The interfacial polymerization process, melt transesterification process, carbonate prepolymer solid-phase transesterification process and cyclic carbonate compound ring-opening polymerization process which are processes for producing a polycarbonate resin are well known through documents and patent publications.

For the production of the resin composition of the present invention, the viscosity average molecular weight (M) of the aromatic polycarbonate resin is not particularly limited but is preferably $1 \times 10^4$ to $5 \times 10^4$, more preferably $1.4 \times 10^4$ to $3 \times 10^4$, much more preferably $1.4 \times 10^4$ to $2.4 \times 10^4$.

Satisfactory mechanical properties are not obtained from an aromatic polycarbonate resin having a viscosity average molecular weight lower than $1 \times 10^4$. A resin composition obtained from an aromatic polycarbonate resin having a viscosity average molecular weight higher than $5 \times 10^4$ is inferior in general-applicability as it has low flowability at the time of injection molding.

The aromatic polycarbonate resin may be obtained by mixing an aromatic polycarbonate resin having a viscosity average molecular weight outside the above range. Especially an aromatic polycarbonate resin having a viscosity average molecular weight higher than the above range ($5 \times 10^4$) has improved entropic elasticity. As a result, it develops high moldability in gas assist molding and foam molding which may be used to mold a reinforced resin material into a structural member. It improves moldability more than the above branched polycarbonate. As a more preferred embodiment, an aromatic polycarbonate resin (component A-1) (may be referred to as "high-molecular weight component-containing aromatic polycarbonate resin" hereinafter) consisting of an aromatic polycarbonate resin having a viscosity average molecular weight of $7 \times 10^4$ to $3 \times 10^5$ (component A-1-1) and an aromatic polycarbonate resin having a viscosity average molecular weight of $1 \times 10^4$ to $3 \times 10^4$ (component A-1-2) and having a viscosity average molecular weight of $1.6 \times 10^4$ to $3.5 \times 10^4$ may also be used as the component A.

In the above high-molecular weight component-containing aromatic polycarbonate resin (component A-1), the molecular weight of the component A-1-1 is preferably $7 \times 10^4$ to $2 \times 10^5$, more preferably $8 \times 10^4$ to $2 \times 10^5$, much more preferably $1 \times 10^5$ to $2 \times 10^5$, particularly preferably $1 \times 10^5$ to $1.6 \times 10^5$. The molecular weight of the component A-1-2 is preferably $1 \times 10^4$ to $2.5 \times 10^4$, more preferably $1.1 \times 10^4$ to $2.4 \times 10^4$, much more preferably $1.2 \times 10^4$ to $2.4 \times 10^4$, particularly preferably $1.2 \times 10^4$ to $2.3 \times 10^4$.

The high-molecular weight component-containing aromatic polycarbonate resin (component A-1) can be obtained by mixing together the above components A-1-1 and A-1-2 in a ratio that ensures that a predetermined molecular weight range is obtained. The content of the component A-1-1 is preferably 2 to 40 wt %, more preferably 3 to 30 wt %, much more preferably 4 to 20 wt %, particularly preferably 5 to 20 wt % based on 100 wt % of the component A-1.

To prepare the component A-1, (1) a method in which the components A-1-1 and A-1-2 are polymerized independently and mixed together, (2) a method in which an aromatic polycarbonate resin showing a plurality of polymer peaks in a molecular weight distribution chart measured by GPC is produced by a method of producing the aromatic polycarbonate in the same system as typified by the method disclosed by JP-A 5-306336 to satisfy the condition of the component A-1 of the present invention, and (3) a method in which the aromatic polycarbonate resin obtained by the above manufacturing method (2) is mixed with the component A-1-1 and/or the component A-1-2 manufactured separately may be employed.

The viscosity average molecular weight in the present invention is obtained as follows. First, the specific viscosity ($\eta_{sp}$) is calculated from a solution prepared by dissolving 0.7 g of the aromatic polycarbonate in 100 ml of methylene chloride at 20° C. with an Ostwald viscometer based on the following equation.

Specific viscosity $(\eta_{sp}) = (t - t_0)/t_0$

[$t_0$ is a time (seconds) required for the dropping of methylene chloride and t is a time (seconds) required for the dropping of a sample solution]

Then, the viscosity average molecular weight M is calculated from the obtained specific viscosity ($\eta_{sp}$) based on the following equation.

$\eta_{sp}/c = [\eta] + 0.45 \times [\eta]^2 c$ ([η] represents an intrinsic viscosity)

$[\eta] = 1.23 \times 10^{-4} M^{0.83}$ $c = 0.7$

The viscosity average molecular weight (M) of the aromatic polycarbonate resin in the resin composition of the present invention is calculated as follows. That is, the resin composition is mixed with methylene chloride in a weight ratio of 1:20 to 1:30 to dissolve soluble matter contained in the resin composition. The soluble matter is collected by cerite filtration. Thereafter, the solvent contained in the obtained solution is removed. After the removal of the solvent, solid matter is dried completely so as to obtain a methylene chloride-soluble solid. The specific viscosity of a solution prepared by dissolving 0.7 g of the solid in 100 ml of methylene chloride is measured at 20° C. as described above so as to calculate the viscosity average molecular weight (M) of the solution therefrom as described above.

(Component B: Polymer Mixture)

The polymer mixture (component B) is obtained by suspension copolymerizing a styrene monomer, a maleic anhydride monomer and an acrylic monomer in the presence of polytetrafluoroethylene particles. The polymer mixture (component B) contains the polytetrafluoroethylene particles and the copolymer.

It can be said that the polymer mixture (component B) has a coating layer of a copolymer obtained by copolymerizing a styrene monomer, a maleic anhydride monomer and an acrylic monomer on the exterior of polytetrafluoroethylene. The coating layer is formed on the surface of polytetrafluoroethylene.

Polytetrafluoroethylene is particulate. The particle diameter of polytetrafluoroethylene is preferably 0.1 to 0.6 μm, more preferably 0.12 to 0.4 μm, much more preferably 0.14 to 0.2 μm. When the particle diameter is smaller than 0.1 μm, the obtained molded article has a good surface appearance but it is difficult to acquire a commercially available product of polytetrafluoroethylene having a particle diameter smaller than 0.1 μm. When the particle diameter is larger than 0.6 μm, the obtained molded article has a bad surface appearance. The number average molecular weight of polytetrafluoroethylene used in the present invention is preferably $1 \times 10^6$ to $1 \times 10^7$, more preferably $2 \times 10^6$ to $9 \times 10^6$. Generally, polytetrafluoroethylene having a high molecular weight is more preferred from the viewpoint of stability.

Polytetrafluoroethylene in a powdery or dispersion form may be used. The polytetrafluoroethylene includes deformed polytetrafluoroethylene which may be used as aflame retardant aid. The polytetrafluoroethylene is commercially available in a powdery or dispersion form according to its molecular weight. Commercially available products of the polytetrafluoroethylene powder used in the component B of the present invention include Teflon (registered trademark) 6J (Mitsui-Dupont Fluoro Chemicals Co., Ltd.) and Polyfuron MPA500 and F-201L (Daikin industries, Ltd.). Commercially available products of the polytetrafluoroethylene dispersion used in the component B of the present invention include Furon AD-1 and AD-936 (Asahi-ICI Fluoropolymers Co., Ltd.), Polyfuron D-1 and D-2 (Daikin Industries, Ltd.), Teflon (registered trademark) 30J (Mitsui-Dupont Fluoro Chemicals Co., Ltd.), FR302 (3F Co.) and JF4DC (Juseng Fluoro Chemicals Co., Ltd.). The present invention is not limited to these. These polytetrafluoroethylene powders or dispersions may be used alone or in combination of two or more.

The polytetrafluoroethylene content of the polymer mixture (component B) is preferably 20 to 60 parts by weight, more preferably 40 to 55 parts by weight, much more preferably 47 to 53 parts by weight, particularly preferably 48 to 52 parts by weight, most preferably 49 to 51 parts by weight based on 100 parts by weight of the polymer mixture (component B). When the polytetrafluoroethylene content falls within the above range, the high dispersibility of polytetrafluoroethylene can be achieved.

The styrene monomer used to prepare the polymer mixture (component B) is styrene which may be substituted by at least one group selected from the group consisting of an alkyl group having 1 to 6 carbon atoms, alkoxy group having 1 to 6 carbon atoms and halogen. Examples of the styrene monomer include styrene, ortho-methylstyrene, meta-methylstyrene, para-methylstyrene, dimethylstyrene, ethyl-styrene, para-tert-butylstyrene, methoxystyrene, fluorostyrene, monobromostyrene, dibromostyrene, tribromostyrene, vinyl xylene and vinyl naphthalene. These styrene monomers may be used alone or in combination of two or more. Out of these, styrene is preferably used, and the recurring unit derived from the styrene monomer in this case is represented by the following formula (1).

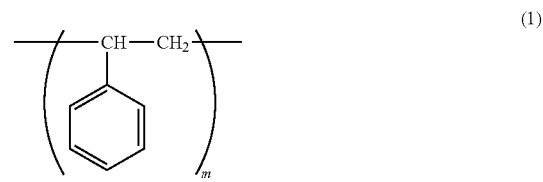

In the above formula (1), m is an integer of 1 to 2,000.

The recurring unit derived from the maleic anhydride monomer used to prepare the polymer mixture (component B) of the present invention is represented by the following formula (2).

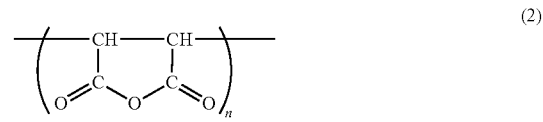

In the above formula (2), n is an integer of 1 to 2,000.

The acrylic monomer used to prepare the polymer mixture (component B) includes a (meth)acrylate derivative which may be substituted. The acrylic monomer is, for example, a (meth)acrylate derivate which may be substituted by at least one group selected from the group consisting of an alkyl group having 1 to 20 carbon atoms, cycloalkyl group having 3 to 8 carbon atoms, aryl group and glycidyl group.

Examples of the (meth)acrylate derivative include methyl (meth)acrylate, ethyl(meth)acrylate, propyl (meth)acrylate, butyl(meth)acrylate, hexyl(meth)acrylate and cyclohexyl (meth)acrylate.

Maleimides which may be substituted by an alkyl group having 1 to 6 carbon atoms or aryl group, such as maleimide, N-methyl-maleimide and N-phenyl-maleimide, maleic acid, phthalic acid and itaconic acid are also included. The acrylic monomers may be used alone or in combination of two or more. Out of these, methyl(meth)acrylate is preferably used. The recurring unit derived from the acrylic monomer is preferably represented by the following formula (3).

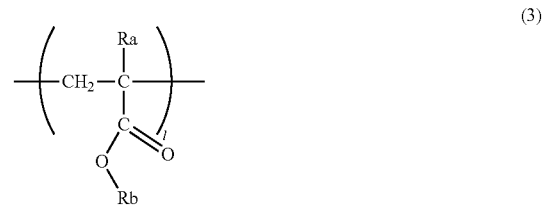

In the above formula (3), Ra is a hydrogen atom or alkyl group having 1 to 3 carbon atoms. Rb is a hydrogen atom or alkyl group having 1 to 3 carbon atoms. l is an integer of 1 to 2,000. Examples of the alkyl group having 1 to 3 carbon atoms are methyl group, ethyl group and propyl group.

The recurring unit derived from the acrylic monomer is more preferably represented by the following formula (3-1).

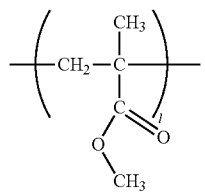

(3-1)

In the above formula (3-1), l is an integer of 1 to 2,000.

The ratio of the styrene monomer-derived unit, the acrylic monomer-derived unit and the maleic anhydride monomer-derived unit in the copolymer is preferably 1:98:1 to 40:40:20, more preferably 1:98:1 to 35:50:15, much more preferably 1:98:1 to 30:60:10. When the ratio falls within this range, the obtained molded article is excellent in surface appearance and impact strength.

The number average molecular weight of the copolymer is preferably 20,000 to 45,000, more preferably 25,000 to 40,000, much more preferably 25,000 to 35,000.

The polymer mixture (component B) has a residual water content of preferably not more than 0.5 wt %, more preferably 0.05 to 0.4 wt %, much more preferably 0.1 to 0.3 wt %. When the residual water content is higher than 0.5 wt %, it may exert a bad influence upon flame retardancy.

The process of producing the polymer mixture (component B) comprises the step of forming a copolymer on the surface layer of polytetrafluoroethylene by suspension polymerizing a styrene monomer, a maleic anhydride monomer and an acrylic monomer in the presence of polytetrafluoroethylene and an initiator. It can be said that the copolymer is the coating layer of polytetrafluoroethylene.

Further, after the copolymer is formed, the production process preferably comprises a drying step for reducing the residual water content to preferably not more than 0.5 wt %, more preferably 0.05 to 0.4 wt %, much more preferably 0.1 to 0.3 wt %. The drying step can be carried out by a method known in this industry such as hot air drying or vacuum drying.

The initiator used in the polymer mixture (component B) is not particularly limited as long as it can be used in the polymerization reaction of a styrene monomer, a maleic anhydride monomer and an acrylic monomer. Examples of the initiator include cumyl hydroperoxide, di-tert-butyl peroxide, benzoyl peroxide, hydrogen peroxide and potassium peroxide. At least one initiator may be used for the polymer mixture (component B) according to reaction conditions. The amount of the initiator is freely selected from among the range which is used in consideration of the amount of polytetrafluoroethylene and the amounts of the monomers but preferably 0.15 to 0.25 part by weight based on the amount of the polymer mixture (component B).

The polymer mixture (component B) is produced by suspension polymerization, preferably by the following procedure.

After water and a polytetrafluoroethylene dispersion (solid content: 60%, polytetrafluoroethylene particle diameter: 0.15 to 0.3 μm) are first fed to a reactor, a styrene monomer, a maleic anhydride monomer, an acrylic monomer and cumene hydroperoxide as a water-soluble initiator are added to the mixture under agitation to carry out a reaction at 80 to 90° C. for 9 hours. After the end of the reaction, centrifugation is carried out by a centrifugal separator for 30 minutes to remove water so as to obtain a paste product. Thereafter, the paste product is dried with a hot air drier at 80 to 100° C. for 8 hours. The dried product is ground to obtain a polymer mixture (component B).

Since the suspension polymerization process does not require a polymerization step which is carried out by emulsion dispersion in the emulsion polymerization process disclosed by Japanese Patent No. 3469391, an emulsifier and an electrolyte salt for solidifying and precipitating a latex after polymerization are not necessary. Since the emulsifier and the electrolyte salt are readily contained in the polymer mixture (component B) produced by emulsion polymerization and hardly removed, it is difficult to reduce the contents of a sodium metal ion and a potassium metal ion derived from the emulsifier and the electrolyte salt.

Since the emulsifier and the electrolyte salt are not used in the suspension polymerization process, it is possible to reduce the contents of the sodium metal ion and the potassium metal ion in the polymer mixture (component B). The content of the sodium metal ion (excluding the sodium metal ion contained in polytetrafluoroethylene) in the polymer mixture (component B) is preferably not more than 10 ppm, more preferably not more than 8 ppm, much more preferably not more than 5 ppm. The content of the potassium metal ion (excluding the potassium metal ion contained in polytetrafluoroethylene) in the polymer mixture (component B) is preferably not more than 15 ppm, more preferably not more than 10 ppm, much more preferably not more than 5 ppm. When the contents of these metal elements are higher than the predetermined values, a catalytic effect which promotes the decomposition of the polycarbonate resin is developed by heat and/or water generated at the time of extrusion or molding, whereby the heat stability and hydrolysis resistance of the resin composition comprising the polymer mixture (component B) may deteriorate. The contents of the sodium metal ion and the potassium metal ion are measured by the following method.

First, about 0.1 g of the polymer mixture (component B) is weighed and put into a quartz vessel, 5 ml of nitric acid is added, and the vessel is sealed up to carry out decomposition by the application of microwaves (MULTIWAVE type of Anton Paar Co., Ltd.). At this point, polytetrafluoroethylene is not decomposed. After decomposition, polytetrafluoroethylene is taken out from the vessel and rinsed in super pure water, the decomposition liquid is added to the rinse water, and super pure water is added to prepare 50 ml of a solution. This solution is suitably diluted to prepare a sample solution. The quantitative analysis of the sodium metal ion and the potassium metal ion contained in the sample solution is carried out by inductively-coupled plasma mass spectrometry (ICP-MS) (Agilent7500cs of Yokogawa Anality Systems Co., Ltd.) to calculate the concentrations of the ions based on the weight of the sample.

Since the polymer mixture (component B) has a coating layer of a copolymer obtained by copolymerizing three components which are a styrene monomer, a maleic anhydride monomer and an acrylic monomer on the surface of polytetrafluoroethylene, the secondary agglomeration of polytetrafluoroethylene hardly occurs and the dispersibility of polytetrafluoroethylene improves, thereby enhancing the impact strength of the obtained molded article. Further, since the copolymer is produced by suspension polymerization without using an emulsifier containing a metal such as Na or K unlike emulsion polymerization, the hydrolysis resistance of the molded article improves.

The particle diameter of the polymer obtained by suspension polymerization is larger than the particle diameter of a polymer obtained by emulsion polymerization because an emulsifier is not used. Therefore, it was expected that polytetrafluoroethylene coated with a polymer obtained by emulsion polymerization has a smaller particle diameter and higher dispersibility than polytetrafluoroethylene coated with a polymer obtained by suspension polymerization, thereby improving the impact strength of the obtained molded article. However, it was found that the impact strength and hydrolysis resistance of the obtained molded article are improved by coating polytetrafluoroethylene by suspension polymerization.

(Component C: Flame Retardant)

The flame retardant (component C) is a compound which is known as a flame retardant for polycarbonate resins. When the flame retardant (component C) is blended, it improves flame retardancy. In addition to this, it improves antistatic properties, flowability, stiffness and heat stability based on its properties.

Examples of the flame retardant (component C) include (i) an organic metal salt-based flame retardant, (ii) an organic phosphorus-based flame retardant and (iii) a silicone-based flame retardant.

Examples of the organic metal salt-based flame retardant (i) include organic sulfonic acid alkali (earth) metal salts, boric acid metal salt-based flame retardants and stannic acid metal salt-based flame retardants. Examples of the organic phosphorus-based flame retardant (ii) include monophosphate compounds, phosphate oligomer compounds, phosphonate oligomer compounds, phosphonitrile oligomer compounds and phosphonic acid amide compounds. Examples of the silicone-based flame retardant (iii) include silicone compounds.

Out of these, at least one flame retardant selected from the group consisting of (i) an organic metal salt-based flame retardant and (iii) a silicone-based flame retardant is preferred.

(i) Organic Metal Salt-Based Flame Retardant

The organic metal salt-based flame retardant (i) is preferably an organic sulfonic acid alkali metal salt or an organic sulfonic acid alkali earth metal salt. An alkali metal or an alkali earth may be expressed as "alkali (earth) metal". The number of carbon atoms of the organic metal salt-based flame retardant (1) is preferably 1 to 50, more preferably 1 to 40.

The organic sulfonic acid alkali (earth) metal salt is preferably a perfluoroalkylsulfonic acid alkali (earth) metal salt. The organic sulfonic acid alkali (earth) metal salt is a metal salt of a fluorine-substituted alkyl sulfonic acid such as a metal salt of a perfluoroalkylsulfonic acid having preferably 1 to 10 carbon atoms, more preferably 2 to 8 carbon atoms and an alkali metal or an alkali earth metal. It is also a metal salt of an aromatic sulfonic acid having preferably 7 to 50 carbon atoms, more preferably 7 to 40 carbon atoms and an alkali metal or alkali earth metal salt.

Examples of the alkali metal constituting the metal salt include lithium, sodium, potassium, rubidium and cesium. Examples of the alkali earth metal include beryllium, magnesium, calcium, strontium and barium. Alkali metals are more preferred. Out of these alkali metals, rubidium and cesium having a large ion radius are preferred when the requirement for transparency is high. However, as they are not used for general purpose and difficult to be purified, they may be disadvantageous in terms of cost. Meanwhile, metals having a small ion radius such as lithium and sodium may be disadvantageous in terms of flame retardancy.

Although an alkali metal in the sulfonic acid alkali metal salt can be selected in consideration of these, a sulfonic acid potassium salt having good balance among properties is most preferred in every respect. The potassium salt may be used in combination with a sulfonic acid alkali metal salt comprising another alkali metal.

Examples of the perfluoroalkylsulfonic acid alkali metal salt include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. They may be used alone or in combination of two or more. The number of carbon atoms of the perfluoroalkyl group is preferably 1 to 18, more preferably 1 to 10, much more preferably 1 to 8. Out of these, potassium perfluorobutanesulfonate is particularly preferred as the organic metal salt-based flame retardant.

In general, a fluoride ion ($F^-$) is contained in the perfluoroalkylsulfonic acid alkali (earth) metal salt comprising an alkali metal to no small extent. Since the existence of the fluoride ion may cause a reduction in flame retardancy, it is preferably reduced as much as possible. The content of the fluoride ion can be measured by ion chromatography. The content of the fluoride ion is preferably not more than 100 ppm, more preferably not more than 40 ppm, particularly preferably not more than 10 ppm. It is advantageously not less than 0.2 ppm from the viewpoint of production efficiency.

A perfluoroalkylsulfonic acid alkali (earth) metal salt whose fluoride ion content has been reduced can be produced by a known method, such as one in which the content of the fluoride ion in the raw material is reduced when a fluorine-containing organic metal salt is produced, one in which hydrogen fluoride obtained by a reaction is removed by a gas generated at the time of the reaction or heating, or one in which the amount of the fluoride ion is reduced by recrystallization and reprecipitation in the production of a fluorine-containing organic metal salt.

Since the flame retardant (component C) is relatively easily soluble in water, it is preferably produced by using ion exchange water, especially water having an electric resistance of not less than 18 MΩ·cm, that is, an electric conductivity of about not more than 0.55 μS/cm to dissolve and clean it at a temperature higher than normal temperature and then cooling it for recrystallization.

Examples of the aromatic sulfonic acid alkali (earth) metal salt include disodium diphenylsulfide-4,4'-disulfonate, dipotassium diphenylsulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecylphenylether disulfonate, polysodium poly(2,6-dimethylphenyleneoxide)polysulfonate, polysodium poly(1,3-phenyleneoxide)polysulfonate, polysodium poly(1,4-phenyleneoxide)polysulfonate, polypotassium poly(2,6-diphenylphenyleneoxide)polysulfonate, lithium poly(2-fluoro-6-butylphenyleneoxide)polysulfonate, potassium sulfonate of benzenesulfonate, sodium benzenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenylsulfone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenylsulfoxide-4-sulfonate, formalin condensate of sodium naphthalenesulfonate, and formalin condensate of sodium anthracenesulfonate.

Out of these aromatic sulfonic acid alkali (earth) metal salts, potassium salts are particularly preferred. Out of these aromatic sulfonic acid alkali (earth) metal salts, potassium diphenylsulfone-3-sulfonate and dipotassium diphenylsulfone-3,3'-disulfonate are more preferred, and a mixture thereof (the weight ratio of the former to the latter is 15/85 to 30/70) is particularly preferred.

Preferred organic metal salts except for the sulfonic acid alkali (earth) metal salts include alkali (earth) metal salts of a sulfuric acid ester and alkali (earth) metal salts of an aromatic sulfonamide. The alkali (earth) metal salts of a sulfuric acid ester include alkali (earth) metal salts of a sulfuric acid ester of a monohydric and/or polyhydric alcohol. Examples of the sulfuric acid ester of a monohydric and/or polyhydric alcohol include methyl sulfuric acid ester, ethyl sulfuric acid ester, lauryl sulfuric acid ester, hexadecyl sulfuric acid ester and sulfuric acid ester of a polyoxyethylene alkylphenyl ether, mono-, di-, tri- and tetra-sulfuric acid esters of pentaerythritol, sulfuric acid ester of monoglyceride laurate, sulfuric acid ester of monoglyceride palmitate and sulfuric acid ester of monoglyceride stearate. Out of these alkali (earth) metal salts of sulfuric acid esters, alkali (earth) metal salts of a lauryl sulfuric acid ester are particularly preferred.

The alkali (earth) metal salts of an aromatic sulfonamide include alkali (earth) metal salts of saccharin, N-(p-tolylsulfonyl)-p-toluenesulfoimide, N—(N'-benzylaminocarbonyl)sulfanilimide and N-(phenylcarboxyl)sulfanilimide.

The content of the organic metal salt-based flame retardant is preferably 0.01 to 20 parts by weight, more preferably 0.03 to 10 parts by weight, much more preferably 0.05 to 5 parts by weight based on 100 parts by weight of the component A.

(ii) Organic Phosphorus-Based Flame Retardant

The organic phosphorus-based flame retardant (ii) is preferably an aryl phosphate compound because the phosphate compound is generally excellent in color. Since the phosphate compound has a plasticizing effect, it can improve the moldability of the resin composition of the present invention advantageously. Although various phosphate compounds which are known as flame retardants may be used as the phosphate compound, one or more phosphate compounds represented by the following general formula (5) are preferred.

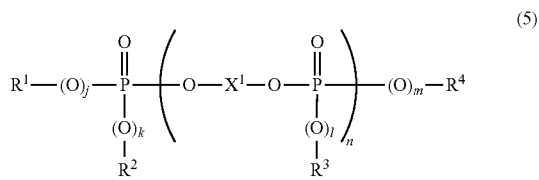

(5)

(wherein $X^1$ is a divalent organic group derived from a dihydric phenol, $R^1$, $R^2$, $R^3$ and $R^4$ are each a monovalent organic group derived from a monohydric phenol, j, k, l and m are each independently 0 or 1, and n is an integer of 0 to 5, in the case of a mixture of phosphates which differ in the degree "n" of polymerization, n is the average value of these, that is, 0 to 5.).

The above phosphate compound may be a mixture of compounds which differ in "n". In the case of a mixture, the average value "n" is preferably 0.5 to 1.5, more preferably 0.8 to 1.2, much more preferably 0.95 to 1.15, particularly preferably 1 to 1.14.

Preferred examples of the dihydric phenol from which $X^1$ is derived include divalent groups obtained by removing two hydroxyl groups of a dihydroxy compound selected from the group consisting of hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone and bis(4-hydroxyphenyl)sulfide.

Examples of $R^1$, $R^2$, $R^3$ and $R^4$ include monovalent groups obtained by removing one hydroxyl group of a monohydroxy compound selected from the group consisting of phenol, cresol, xylenol, isopropylphenol, butylphenol and p-cumylphenol which may be independently substituted by at least one halogen atom. Preferred examples of the monohydric phenol from which $R^1$, $R^2$, $R^3$ and $R^4$ are derived include phenol, cresol, xylenol, isopropylphenol, butylphenol and p-cumylphenol. Out of these, phenol and 2,6-dimethylphenol are preferred.

The monohydric phenol may be substituted by a halogen atom. Examples of the phosphate compound having a group derived from the monohydric phenol include tris(2,4,6-tribromophenyl)phosphate, tris(2,4-dibromophenyl)phosphate and tris(4-bromophenyl)phosphate.

Examples of the phosphate compound which is not substituted by a halogen atom include monophosphate compounds such as triphenyl phosphate and tri(2,6-xylyl)phosphate, a phosphate oligomer essentially composed of resorcinol bisdi(2,6-xylyl)phosphate, phosphate oligomer essentially composed of 4,4-dihydroxydiphenyl bis(diphenylphosphate), and phosphoric acid ester oligomer essentially composed of bisphenolAbis(diphenylphosphate). The word "essentially" means that another component having a different degree of polymerization may be contained in a small amount, more advantageously, a component of the above formula (5) in which n=1 is contained in an amount of preferably not less than 80 wt %, more preferably not less than 85 wt %, much more preferably not less than 90 wt %.

The content of the organic phosphorus-based flame retardant is preferably 0.01 to 20 parts by weight, more preferably 2 to 15 parts by weight, much more preferably 2 to 10 parts by weight based on 100 parts by weight of the component A.

(iii) Silicone-Based Flame Retardant

A silicone compound used as the silicone-based flame retardant improves flame retardancy through its chemical reaction at the time of combustion. Various compounds proposed as flame retardants for aromatic polycarbonate resins may be used as the compound. It is considered that the silicone compound provides a flame retarding effect to a polycarbonate resin by bonding itself or to a component derived from the resin at the time of combustion to form a structure or through a reduction reaction at the time of forming the structure. Therefore, it is preferred that the silicone compound should contain a highly active group, specifically a predetermined amount of at least one group selected from an alkoxy group and hydrogen (that is, Si—H group) at the time of the reaction. The content of the group (alkoxy group, Si—H group) is preferably 0.1 to 1.2 mol/100 g, more preferably 0.12 to 1 mol/100 g, much more preferably 0.15 to 0.6 mol/100 g. This content can be obtained by measuring the amount of hydrogen or alcohol generated per unit weight of the silicone compound by an alkali decomposition method. The alkoxy group is preferably an alkoxy group having 1 to 4 carbon atoms, particularly preferably methoxy group.

The structure of the silicone compound is generally constituted by combining the following four different kinds of siloxane units arbitrarily. That is, they are:

M units: monofunctional siloxane units such as $(CH_3)_3 SiO_{1/2}$, $H(CH_3)_2SiO_{1/2}$, $H_2(CH_3)SiO_{1/2}$ $(CH_3)_2(CH_2=CH)SiO_{1/2}$ $(CH_3)_2 (C_6H_5) SiO_{1/2}$ and $(CH_3)(C_6H_5)(CH_2=CH) SiO_{1/2}$ D units: bifunctional siloxane units such as $(CH_3)_2SiO$, $H(CH_3) SiO$, $H_2SiO$, $H(C_6H_5) SiO$, $(CH_3)(CH_2=CH) SiO$ and $(C_6H_5)_2SiO$ T units: trifunctional siloxane units such as $(CH_3)SiO_{3/2}$, $(C_3H_7) SiO_{3/2}$, $HSiO_{3/2}$, $(CH_2=CH) SiO_{3/2}$ and $(C_6H_5) SiO_{3/2}$ Q unit: tetrafunctional siloxane unit represented by $SiO_2$ The structure of the silicone compound used as the silicone-based flame retardant is represented by $D_n$, $T_p$, $M_mD_n$, $M_mT_p$, $M_nQ_q$, $M_mD_nT_p$, $M_mD_nQ_q$, $M_mT_pQ_q$, $M_mD_nT_pQ_q$, $D_nT_p$, $D_nQ_q$ or $D_nT_pQ_q$. Out of these, the structure of the silicone compound is represented by preferably $M_mD_n$, $M_mT_p$, $M_mD_nT_p$ or $M_mD_nQ_q$, more preferably $M_mD_n$ or $M_mD_nT_p$.

The coefficients m, n, p and q in the above rational formulae are each an integer of 1 or more, indicating the polymerization degree of the siloxane unit, and the total number of coefficients in the formulae is the average polymerization degree of the silicone compound. The average polymerization degree is preferably 3 to 150, more preferably 3 to 80, much more preferably 3 to 60, particularly preferably 4 to 40. Within the more preferred range, higher flame retardancy is obtained. As will be described hereinafter, a silicone compound containing a predetermined amount of an aromatic group is also excellent in transparency and color. As a result, good reflected light is obtained.

When any one of m, n, p and q is 2 or more, 2 or more of the siloxane units having this coefficient may differ in the hydrogen atom or organic residue bonded thereto.

The silicone compound may have a linear or branched structure. The organic residue bonded to the silicon atom has preferably 1 to 30 carbon atoms, more preferably 1 to 20 carbon atoms. Examples of the organic residue include alkyl groups such as methyl group, ethyl group, propyl group, butyl group, hexyl group and decyl group, cycloalkyl groups such as cyclohexyl group, aryl groups such as phenyl group and aralkyl groups such as tolyl group. It is more preferably an alkyl group having 1 to 8 carbon atoms, alkenyl group having 1 to 8 carbon atoms or aryl group having 5 to 20 carbon atoms. The alkyl group is particularly preferably an alkyl group having 1 to 4 carbon atoms such as methyl group, ethyl group or propyl group.

Further, the silicone compound used as the silicone-based flame retardant preferably contains an aryl group. A silane compound and a siloxane compound as organic surface treating agents for a titanium dioxide pigment are clearly distinguished from the silicone-based flame retardant as a preferred effect is obtained when they do not contain an aryl group. The silicone-based flame retardant is more preferably a silicone compound which contains an aromatic group represented by the following general formula (4) in an amount of preferably 10 to 70 wt %, more preferably 15 to 60 wt %.

(In the formula (4), X's are each independently an OH group or hydrocarbon group having 1 to 20 carbon atoms which may have a hetero atom-containing functional group. n is an integer of 0 to 5. Further, in the formula (4), when n is 2 or more, X's may be different from each other.)

A silicone compound used as the silicone-based flame retardant may contain a reactive group in addition to the above Si—H group and alkoxy group. Examples of the reactive group include amino group, carboxyl group, epoxy group, vinyl group, mercapto group and methacryloxy group.

A silicone compound having an Si—H group is preferably a silicone compound having at least one structural unit represented by the following formula (6) or (7).

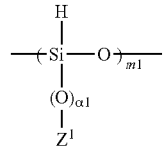

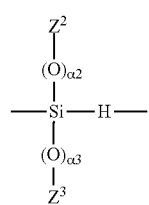

(In the formulas (6) and (7), $Z^1$ to $Z^3$ are each independently a hydrogen atom, monovalent organic residue having 1 to 20 carbon atoms or compound represented by the following general formula (8). α1 to α3 are each independently 0 or 1. m1 is an integer of 0, 1 or more. Further, when m1 is 2 or more in the formula (6), the recurring units may be different from each other.)

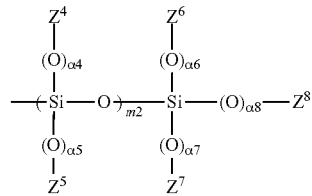

(In the formula (8), $Z^4$ to $Z^8$ are each independently a hydrogen atom or monovalent organic residue having 1 to 20 carbon atoms. α4 to α8 are each independently 0 or 1. m2 is 0 or an integer of 1 or more. Further, when m2 is 2 or more in the formula (8), the recurring units may be different from each other.)

A silicone compound used as the silicone-based flame retardant is at least one compound selected from the group consisting of compounds represented by the following formulas (9) and (10) as the silicone compound having an alkoxy group.

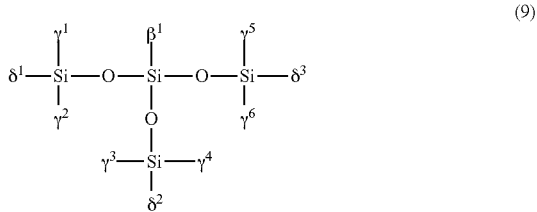

(In the formula (9), $\beta^1$ is a vinyl group, alkyl group having 1 to 6 carbon atoms, cycloalkyl group having 3 to 6 carbon atoms, or aryl group or aralkyl group having 6 to 12 carbon atoms. $\gamma^1$, $\gamma^2$, $\gamma^3$, $\gamma^4$, $\gamma^5$ and $\gamma^6$ are each an alkyl group or cycloalkyl group having 1 to 6 carbon atoms, or aryl group or aralkyl group having 6 to 12 carbon atoms, and at least one of them is an aryl group or aralkyl group. $\delta^1$, $\delta^2$ and $\delta^2$ are each an alkoxy group having 1 to 4 carbon atoms.)

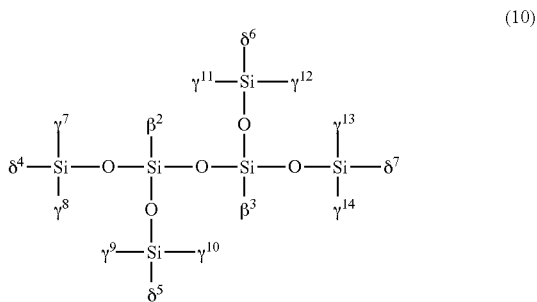

(In the formula (10), $\beta^2$ and $\beta^3$ are each a vinyl group, alkyl group having 1 to 6 carbon atoms, cycloalkyl group having 3 to 6 carbon atoms, or aryl group or aralkyl group having 6 to 12 carbon atoms. $\gamma^7$, $\gamma^8$, $\gamma^9$, $\gamma^{10}$, $\gamma^{11}$, $\gamma^{12}$, $\gamma^{13}$ and $\gamma^{14}$ are each an alkyl group having 1 to 6 carbon atoms, cycloalkyl group having 3 to 6 carbon atoms, or aryl group or aralkyl group having 6 to 12 carbon atoms, and at least one of them is an aryl group or aralkyl group. $\delta^4$, $\delta^5$, $\delta^6$ and $\delta^7$ are each an alkoxy group having 1 to 4 carbon atoms.)

Further, when the silicone-based flame retardant has siloxane units M, $M^H$, D, $D^H$, $D^{\Phi 2}$, T and $T^\Phi$ represented by the following structural formulas (M: $(CH_3)_3SiO_{1/2}$
$M^H$: $H(CH_3)_2SiO_{1/2}$
D: $(CH_3)_2SiO$
$D^H$: $H(CH_3)_2SiO$
$D^{\Phi 2}$: $(C_6H_5)_2SiO$
T: $(CH_3)SiO_{3/2}$
$T^\Phi$: $(C_6H_5)SiO_{3/2}$)

and the average numbers of these siloxane units per molecule are represented by m, $m_h$, d, $d_h$, $d_{p2}$, t and $t_p$, respectively, all of the following relational expressions are preferably satisfied.

$$2 \leq m+m_h \leq 40$$

$$0.35 \leq d+d_h+d_{p2} \leq 148$$

$$0 \leq t+t_p \leq 38$$

$$0.35 \leq m_h+d_h \leq 110.$$

Outside the above ranges, it is difficult for the resin composition of the present invention to achieve high flame retardancy and excellent transparency at the same time. The content of the silicone-based flame retardant is preferably 0.01 to 20 parts by weight, more preferably 0.5 to 10 parts by weight, much more preferably 1 to 5 parts by weight based on 100 parts by weight of the component A.

(Component D: Thermoplastic Resin Except for Aromatic Polycarbonate Resin)

The resin composition of the present invention may contain another thermoplastic resin (component D) in place of part of the aromatic polycarbonate resin as the component A as long as the effect of the present invention is obtained. The content of the another thermoplastic resin (component D) is preferably 1 to 50 parts by weight, more preferably 1 to 20 parts by weight, much more preferably 1 to 10 parts by weight, particularly preferably 1 to 5 parts by weight based on 100 parts by weight of the component A.

Examples of the another thermoplastic resin (component D) include polyester resins such as polyethylene terephthalate and polybutylene terephthalate, polyamide resins, polyimide resins, polyether imide resins, polyurethane resins, silicone resins, polyphenylene ether resins, polyphenylene sulfide resins, polysulfone resins, polyolefin resins such as polyethylene and polypropylene, polystyrene resins, acrylonitrile/styrene copolymer (AS resin), acrylonitrile/butadiene/styrene copolymer (ABS resin), polymethacrylate resins, phenolic resins, epoxy resins, isobutylene/isoprene rubber, styrene/butadiene rubber, ethylene/propylene rubber, acrylic elastomers, polyester-based elastomers, polyamide-based elastomers, MBS (methyl methacrylate/styrene/butadiene) rubber which is a core-shell type elastomer, and MAS (methyl methacrylate/acrylonitrile/styrene) rubber. Out of these, polyester resins and/or ABS resin are preferred.

(Other Additives)

The resin composition of the present invention may contain additives which are contained in an ordinary polycarbonate resin, in addition to the above components A to D.

(I) Phosphorus-Based Stabilizer

The resin composition of the present invention may contain a phosphorus-based stabilizer to such an extent that its hydrolyzability is not promoted. The phosphorus-based stabilizer improves heat stability, mechanical properties, color and molding stability at the time of molding or production. The phosphorus-based stabilizer is, for example, phosphorous acid, phosphoric acid, phosphonous acid, phosphonic acid, ester thereof or tertiary phosphine.

Specific examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a dihydric phenol and have a cyclic structure may also be used. These phosphite compounds include 2,2-methylenebis(4,6-di-tert-butylphenyl)(2,4-di-tert-butylphenyl)phosphite,
2,2'-methylenebis(4,6-di-tert-butylphenyl)(2-tert-butyl-4-methylphenyl)phosphite,
2,2'-methylenebis(4-methyl-6-tert-butylphenyl)(2-tert-butyl-4-methylphenyl)phosphite and
2,2'-ethylidenebis(4-methyl-6-tert-butylphenyl)(2-tert-butyl-4-methylphenyl)phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Out of these, triphenyl phosphate and trimethyl phosphate are preferred.

Examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Out of these, tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be and is preferably used in combination with a phosphite compound having aryl groups substituted for two or more of the above alkyl groups.

Examples of the phosphonate compound include dimethylbenzene phosphonate, diethylbenzene phosphonate and dipropylbenzene phosphonate.

Examples of the tertiary phosphine include triethyl phosphine, tripropyl phosphine, tributyl phosphine, trioctyl phosphine, triamyl phosphine, dimethylphenyl phosphine, dibutylphenyl phosphine, diphenylmethyl phosphine, diphenyloctyl phosphine, triphenyl phosphine, tri-p-tolyl phosphine, trinaphthyl phosphine and diphenylbenzyl phosphine. The particularly preferred tertiary phosphine is triphenyl phosphine.

The above phosphorus-based stabilizers may be used alone or in combination of two or more. Out of the above phosphorus-based stabilizers, alkyl phosphate compounds typified by trimethyl phosphate are preferred. A combination of an alkyl phosphate compound and a phosphite compound and/or a phosphonite compound is also preferred.

(II) Hindered Phenol-Based Stabilizer

The resin composition of the present invention may contain a hindered phenol-based stabilizer. The hindered phenol-based stabilizer suppresses the worsening of color during molding and after long-term use. Examples of the hindered phenol-based stabilizer include α-tocopherol, butylhydroxytoluene, cinnapyl alcohol, vitamin E, n-octadecyl-β-(4'-hdyroxy-3',5'-di-tert-butylphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl) propionate, 1,6-hexanediol-bis[3-(3,5-di-tert-butyl-4-hydroxyphenyl) propionate], bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hdyroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl)isocyanurate, 1,3,5-tris-2[3(3,5-di-tert-butyl-4-hydroxyphenyl)propionyloxy]ethyl isocyanurate and tetrakis[methylene-3-(3',5'-di-tert-butyl-4-hydroxyphenyl)propionate]methane. All of them are easily acquired. The above hindered phenol-based stabilizers may be used alone or in combination of two or more.

The contents of the above phosphorus-based stabilizer and the hindered phenol-based stabilizer are each preferably 0.0001 to 1 part by weight, more preferably 0.001 to 0.5 part by weight, much more preferably 0.005 to 0.3 part by weight based on 100 parts by weight of the component A.

(III) Reinforcing Filler

The resin composition of the present invention may contain a known filler as a reinforcing filler. However, since a high degree of whiteness is required for the resin composition of the present invention, a silicate mineral-based filler or glass-based filler having a high degree of whiteness is preferred as the reinforcing filler. Preferred examples of the silicate mineral-based filler include talc, muscovite mica, synthetic fluorine mica, smectite and wollastonite. Examples of the glass-based filler include glass fibers, glass flakes and glass milled fibers. A silicate mineral-based filler and glass-based filler coated with a metal oxide such as titanium oxide, zinc oxide, cerium oxide or silicon oxide may also be used.

The reinforcing filler may be surface treated with a surface treating agent. Examples of the surface treating agent include silane coupling agents (including alkylalkoxysilanes and polyorganohydrogen siloxanes), higher fatty acid esters, acid compounds (such as phosphorous acid, phosphoric acid, carboxylic acid and carboxylic anhydride) and waxes. The reinforcing filler may be granulated by a sizing agent such as a resin, higher fatty acid ester or wax.

The reinforcing filler can be used in an amount up to 100 parts by weight based on 100 parts by weight of the component A. This upper limit is preferably 25 parts by weight, more preferably 20 parts by weight.

(IV) Other Heat Stabilizers

The resin composition of the present invention may contain another heat stabilizer except for the above phosphorus-based stabilizer and the hindered phenol-based stabilizer. Examples of the another heat stabilizer include lactone-based stabilizers typified by a reaction product of 3-hydroxy-5,7-di-tert-butylfuran-2-one and o-xylene. Details of the stabilizer are described in JP-A 7-233160. The compound is marketed as Irganox HP-136 (registered trademark, manufactured by Ciba Specialty Chemicals, K.K.) and may be used. Further, a stabilizer comprising the compound, a phosphite compound and a hindered phenol compound is available in the market. For example, Irganox HP-2921 of the above company is such a good example. The content of the lactone-based stabilizer is preferably 0.0005 to 0.05 part by weight, more preferably 0.001 to 0.03 part by weight based on 100 parts by weight of the component A.

Other stabilizers include sulfur-containing stabilizers such as pentaerythritol tetrakis(3-mercaptopropionate), pentaerythritol tetrakis(3-laurylthiopropionate) and glycerol-3-stearylthiopropionate. The content of the above sulfur-containing stabilizer is preferably 0.001 to 0.1 part by weight, more preferably 0.01 to 0.08 part by weight based on 100 parts by weight of the component A.

(V) Ultraviolet Light Absorber

The resin composition of the present invention may contain an ultraviolet light absorber to provide light resistance.

Benzophenone-based ultraviolet light absorbers include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrideratebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Benzotriazole-based ultraviolet light absorbers include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidemethyl)-5-methylphenyl]benzotriazole, and a polymer having a 2-hydroxyphenyl-2H-benzotraizole skeleton such as a copolymer of 2-(2'-hydroxy-5-methacryloxyethylphenyl)-2H-benzotriazole and a vinyl-based monomer copolymerizable with the monomer or a copolymer of 2-(2'-hydroxy-5-acryloxyethylphenyl)-2H-benzotriazole and a vinyl-based monomer copolymerizable with the monomer.

Hydroxyphenyltriazine-based ultraviolet light absorbers include 2-(4,6-diphenyl-1,3-5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Compounds having a 2,4-dimethylphenyl group in place of the phenyl groups of the above compounds such as 2-(4,6-bis(2,4-dimethylphenyl)-1,3,5-triazin-2-yl)-5-hexyloxyphenol may also be used.

Cyclic iminoester-based ultraviolet light absorbers include 2,2'-p-phenylenebis(3,1-benzoxazin-4-one), 2,2'-m-phenylenebis(3,1-benzoxazin-4-one) and 2,2'-p,p'-diphenylenebis(3,1-benzoxazin-4-one).

Cyanoacrylate-based ultraviolet light absorbers include 1,3-bis[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

Further, the above ultraviolet light absorbers may be polymer type ultraviolet light absorbers obtained by copolymerizing an ultraviolet light absorbing monomer having a radically polymerizable structure and/or an optical stabilizing monomer with a monomer such as an alkyl (meth)acrylate. The above ultraviolet light absorbing monomer is preferably a compound having a benzotriazole skeleton, benzophenone skeleton, triazine skeleton, cyclic iminoester skeleton or cyanoacrylate skeleton in the ester substituent of a (meth) acrylic acid ester.

Out of these, benzotriazole-based and hydroxyphenyltriazine-based ultraviolet light absorbers are preferred from the viewpoint of ultraviolet light absorptivity, and cyclic iminoester-based and cyanoacrylate-based ultraviolet light absorbers are preferred from the viewpoints of heat resistance and color. The above ultraviolet light absorbers may be used alone or in combination of two or more.

The content of the ultraviolet light absorber is preferably 0.01 to 2 parts by weight, more preferably 0.02 to 2 parts by weight, much more preferably 0.03 to 1 part by weight, most preferably 0.05 to 0.5 part by weight based on 100 parts by weight of the component A.

(VI) Other Components

The resin composition of the present invention may contain additives known per se to provide various functions to a molded article and improve its characteristic properties. These additives are used in normal amounts as long as the object of the present invention is not impaired.

The additives include a lubricant (such as PTFE particles), colorant (pigment or dye such as carbon black or titanium oxide), light diffusing agent (such as acrylic crosslinked particles, silicone crosslinked particles or calcium carbonate particles), fluorescent dye, fluorescent brightener, optical stabilizer (typified by hindered amine compounds), inorganic phosphor (such as a phosphor comprising an aluminate as a mother crystal), antistatic agent, crystal nucleating agent, inorganic or organic antifungus agent, optical catalyst-based anti-fouling agent (such as particulate titanium oxide or particular zinc oxide), release agent, fluidity modifier, radical generator, infrared light absorber (heat ray absorber) and photochromic agent.

<Process of Producing Resin Composition>

The present invention includes a process of producing a resin composition, comprising mixing together (A) 100 parts by weight of an aromatic polycarbonate resin (component A), (B) 0.01 to 6 parts by weight of a polymer mixture obtained by suspension polymerizing a styrene monomer, a maleic anhydride monomer and an acrylic monomer in the presence of polytetrafluoroethylene particles (component B), and (C) 0.01 to 30 parts by weight of a flame retardant (component C).

To achieve the excellent dispersion of the polymer mixture (component B), in the production process of the resin composition of the present invention, mixing is preferably carried out by melt kneading these components by means of a multi-screw extruder such as a double-screw extruder.

Typical examples of the double-screw extruder include ZSK (of Werner & Pfleiderer Co., Ltd., trade name). Other examples of the extruder of the same type include TEX (of The Japan Steel Works, Ltd., trade name), TEM (of Toshiba Machine Co., Ltd., trade name), and KTX (of Kobe Steel, Ltd., trade name). Melt kneaders such as FCM (of Farrel Co., Ltd., trade name), Ko-Kneader (of Buss Co., Ltd., trade name) and DSM (of Krauss-Maffei Co., Ltd., trade name) may also be used. Out of these, a ZSK type double-screw extruder is more preferred. In the ZSK type double-screw extruder, the screws are of a completely interlocking type and consist of screw segments which differ in length and pitch and kneading disks which differ in width (or kneading segments corresponding to these).

A preferred example of the double-screw extruder is as follows. As for the number of screws, one, two or three screws may be used, and two screws can be preferably used because they have wide ranges of molten resin conveyance capacity and shear kneading capacity. The ratio (L/D) of the length (L) to the diameter (D) of each of the screws of the double-screw extruder is preferably 20 to 45, more preferably 28 to 42. When L/D is large, homogeneous dispersion is easily attained but when L/D is too large, the decomposition of the resin readily occurs by heat deterioration. The screw must have at least one, preferably one to three kneading zones, each composed of a kneading disk segment (or a kneading segment corresponding to this) in order to improve kneadability.

Further, an extruder having a vent for removing moisture contained in raw materials and a volatile gas generated from the molten kneaded resin may be preferably used. A vacuum pump is preferably installed to discharge the moisture or volatile gas to the outside of the extruder from the vent efficiently. A screen for removing foreign matter contained in the raw materials to be extruded may be installed in a zone before the dice of the extruder to eliminate foreign matter from the resin composition. Examples of the screen include a metal net, screen changer and sintered metal plate (disk filter, etc.).

Further, the method of supplying the components B to D and other additives (to be simply referred to as "additives" in the following examples) into the extruder is not particularly limited. The following methods are typical examples of the method: (i) one in which the additives are supplied into an extruder independently of the polycarbonate resin, (ii) one in which the additives and the polycarbonate resin powder are pre-mixed together by a mixer such as a super mixer and supplied into an extruder, and (iii) one in which the additives and the polycarbonate resin are molten and kneaded together in advance to prepare a master pellet.

One example of the above method (ii) is to pre-mix all the necessary raw materials together and supply the resulting pre-mixture into the extruder. Another example of the method is to prepare a master agent which contains the additives in high concentrations and supply the master agent into the extruder independently or after it is pre-mixed with the rest of the polycarbonate resin. The master agent may be in the form of a powder or granule prepared by compacting and granulating the powder. Other pre-mixing means include a Nauter mixer, twin-cylinder mixer, Henschel mixer, mechanochemical device and extrusion mixer. Out of these, a high-speed agitation type mixer such as a super mixer is preferred. Another pre-mixing method is to uniformly disperse the polycarbonate resin and the additives in a solvent to prepare a solution and remove the solvent from the solution.

The resin extruded from the extruder is pelletized by directly cutting it or by forming it into a strand and cutting the strand by a pelletizer. When the influence of extraneous dust must be reduced, the atmosphere surrounding the extruder is preferably made clean. In the production of the above pellet, it is possible to narrow the shape distribution of pellets and reduce the number of miscut products, the amount of fine powders generated at the time of conveyance or transportation and the number of cells (vacuum cells) formed in the strand or pellet by using various methods already proposed for polycarbonate resins for optical disks. Thereby, the molding cycle can be increased and the incidence of a defect such as a silver streak can be reduced.

The shape of the pellet may be columnar, rectangular column-like or spherical, preferably columnar. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

<Molded Article>

The resin composition pellet produced as described above can be injection molded to produce various products. The resin composition which has been melt kneaded by means of an extruder may be directly molded into a sheet, film, profile extrusion molded article, direct blow molded article or injection molded article without being pelletized.

Molded articles can be obtained not only by ordinary molding techniques but also by injection molding techniques such as injection compression molding, injection press molding, gas assist injection molding, foam molding (including what comprises the injection of a super-critical fluid), insert molding, in-mold coating molding, insulated runner molding, quick heating and cooling molding, two-color molding, sandwich molding and super high-speed injection molding according to purpose. The advantages of these molding techniques are already widely known. Both cold-runner molding and hot-runner molding techniques may be employed.

The resin composition of the present invention may be formed into a profile extrusion molded article, sheet or film by extrusion molding. Inflation, calendering and casting techniques may also be used to mold a sheet or film. Further, a specific stretching operation may be used to mold it into a heat shrinkable tube. The resin composition of the present invention can be formed into a molded article by rotational molding or blow molding.

Thereby, there is provided a molded article having a good appearance and excellent impact strength, heat stability and hydrolysis resistance. That is, according to the present invention, there is provided a molded article obtained by melt molding a resin composition which comprises (A) 100 parts by weight of an aromatic polycarbonate resin (component A), (B) 0.01 to 6 parts by weight of a polymer mixture obtained by suspension polymerizing a styrene monomer, a maleic anhydride monomer and an acrylic monomer in the presence of polytetrafluoroethylene particles (component D), and (C) 0.01 to 30 parts by weight of a flame retardant (component C).

Further, a molded article of the resin composition of the present invention can be subjected to a surface treatment. The surface treatment as used herein is deposition (physical deposition, chemical deposition, etc.), plating (electroplating, electroless plating, hot dipping, etc.), painting, coating or printing, all of which are used to form a new layer on the surface layer of a resin molded article and used for ordinary polycarbonate resins. Specific examples of the surface treatment include hard coating, water-repellent and oil-repellent coating, ultraviolet light absorption coating, infrared light absorption coating and metallizing (such as deposition).

<Method of Improving Impact Strength of Molded Article>

The present invention is a method of improving the impact strength of a molded article of a resin composition comprising an aromatic polycarbonate resin, polytetrafluoroethylene particles and a flame retardant, wherein a polymer mixture obtained by suspension polymerizing a styrene monomer, a maleic anhydride monomer and an acrylic monomer in the presence of polytetrafluoroethylene particles is used as polytetrafluoroethylene particles.

An embodiment of the present invention which the inventor thinks is the best at present is an aggregation of preferred ranges of the above requirements, and typical examples thereof are described in the following examples. As a matter of course, the present invention is not limited to these.

EXAMPLES

The following examples are provided to further illustrate the present invention. Evaluations were made by the following methods.
(1) Flame Retardancy An UL94 vertical burn test was made on a sample having a thickness of 1.8 mm or 2.0 mm to evaluate its flame retardancy.
(2) Evaluation of Appearance The obtained pellet was dried at 120° C. with a hot air drier for 6 hours and molded into a plate having a thickness of 2 mm (length of 40 mm, width of 50 mm) at a cylinder temperature of 280° C. and a mold temperature of 70° C. with an injection molding machine (SG-150U of Sumitomo Heavy Industries, Ltd.). 10 shots of the resin right after purge were discarded, and an 11-th shot was used for the evaluation of the surface state (existence of a streak on the surface). The sample was evaluated based on the following criteria.
◯: formation of no streak
Δ: formation of a slight streak
X: formation of a streak
(3) Impact Strength
(i) Measurement of Sharpy Impact Strength An impact test sample was formed by injection molding to measure its notched Sharpy impact strength in accordance with ISO 179.
(ii) Measurement of High-Speed Surface Impact The obtained pellet was dried at 120° C. with a hot air drier for 6 hours and molded into a plate having a thickness of 2 mm (length of 150 mm, width of 150 mm) at a cylinder temperature of 280° C. and a mold temperature of 70° C. with an injection molding machine (SG-150U of Sumitomo Heavy Industries, Ltd.) to carry out a high-speed surface impact test (Hydroshot MTH-1 of Shimadzu Corporation, base radius: 12.8 mm, radical of the punch striker radius: 6.4 mm) so as to measure breaking energy. Larger breaking energy is more preferred.
(4) Heat Stability
(i) Measurement of Molecular Weight Loss (ΔMV)

The obtained pellet was dried at 120° C. with a hot air drier for 6 hours and molded into a plate having a thickness of 2 mm (length of 40 mm, width of 50 mm) at a cylinder temperature of 280° C. and a mold temperature of 70° C. with an injection molding machine (SG-150U of Sumitomo Heavy Industries, Ltd.). After 20 shots were continuously molded to obtain a molded plate, an injection cylinder was retreated to keep the molten resin in the cylinder for 10 minutes after the weighing of the resin was completed. After the residence, 4 shots were molded again under the same conditions. The molded plate of the resin composition kept in the cylinder was produced by the above molding. The viscosity average molecular weight of the pellet was measured by the method described herein. Meanwhile, the viscosity average molecular weight of the molded plate of a 4-th shot after residence was measured likewise. The value obtained by subtracting the molecular weight of the molded plate after residence from the molecular weight of the pellet was evaluated as ΔMv. It can be said that as ΔMv becomes smaller, heat stability becomes higher.
(5) Hydrolysis Resistance The obtained pellet was dried at 120° C. with a hot air drier for 6 hours and molded into a plate having a thickness of 2 mm (length of 40 mm, width of 50 mm) at a cylinder temperature of 280° C. and a mold temperature of 70° C. with an injection molding machine (SG-150U of Sumitomo Heavy Industries, Ltd.). 10 shots of the resin right after purge were discarded, and the molded plate of an 11-th shot was used for the evaluation of hydrolysis resistance. A pressure cooker (pc-305III/V pressure cooker manufactured by Hirayama Mfg. Co., Ltd.) was used to carry out a hydrolysis resistance test under specific treating conditions (treating temperature: 120° C., treating humidity: 100%, treating time: 48 hours) so as to measure the viscosity average molecular weight of the molded plate after the treatment by the method described herein. Meanwhile, the viscosity average molecular weight of the molded plate before the treatment was measured likewise. The value obtained by subtracting the molecular weight of the molded plate after the treatment from the molecular weight of the molded plate before the treatment was evaluated as ΔMv. It can be said that as ΔMy becomes smaller, hydrolysis resistance becomes higher.

Examples 1 to 15 and Comparative Examples 1 to 13

Additives shown in Tables 1 to 3 were added to a polycarbonate resin powder produced from bisphenol A and phosgene by interfacial polycondensation in a ratio shown in Tables 1 to 3, mixed with the powder by a blender and melt kneaded by a vented double-screw extruder (TEX30α of The Japan Steel Works, Ltd.) (completely interlocking type, unidirectional rotation, double screws) to obtain a pellet. A premixture of the polycarbonate resin powder and the additives in a ratio of 1:10 was prepared by a Henschel mixer and totally mixed by the blender. The extrusion conditions were a delivery rate of 20 kg/h, a screw revolution of 150 rpm and a vent vacuum degree of 3 kPa, and the extrusion temperature from the first feed port to the dice was 260° C.

The obtained pellet was dried at 120° C. with a hot air circulating drier for 6 hours and molded into a test sample and an impact test sample, both having a length of 40 mm, a width of 50 mm and a thickness of 2 mm, simultaneously at a cylinder temperature of 290° C., a mold temperature of 80° C. and an injection speed of 50 mm/sec by an injection molding machine. The SG-150U injection molding machine of Sumitomo Heavy Industries, Ltd. was used. The evaluation results of the obtained molded plates are shown in Tables 1 to 3.

The components shown in Tables 1 to 3 are given below.
(Component A)
PC-1: linear aromatic polycarbonate resin powder synthesized from bisphenol A, p-tert-butylphenol as a terminal capping agent and phosgene by interfacial polycondensation (Panlite L-1225WP (trade name) of Teijin Chemicals Ltd., viscosity average molecular weight of 22,400)
PC-2: linear aromatic polycarbonate resin powder synthesized from bisphenol A, p-tert-butylphenol as a terminal capping agent and phosgene by interfacial polycondensation (L-1225WS (trade name) of Teijin Chemicals Ltd., viscosity average molecular weight of 20,900)
(Component B)
B-1: SN3300B5 (trade name) (manufactured by Shine Polymer Co., Ltd.) obtained by suspension polymerizing styrene, maleic anhydride and methyl methacrylate in the presence of polytetrafluoroethylene particles (polytetrafluoroethylene content of 50 wt %)

(Component B for Comparison)
B-2: POLY TS AD001 (trade name) (manufactured by PIC Co., Ltd.) obtained by suspension polymerizing styrene and acrylonitrile in the presence of polytetrafluoroethylene particles (polytetrafluoroethylene content of 50 wt %)
B-3: Blendex449 (trade name) (manufactured by Cronpton Co., Ltd.) obtained by emulsion polymerizing styrene and acrylonitrile in the presence of polytetrafluoroethylene particles (polytetrafluoroethylene content of 50 wt %)
B-4: SN3300 (trade name) (manufactured by Shine Polymer Co., Ltd.) obtained by suspension polymerizing styrene and acrylonitrile in the presence of polytetrafluoroethylene particles (polytetrafluoroethylene content of 60 wt %)
B-5: Polyfuron MPA FA500 (trade name) (manufactured by Daikin Industries, Ltd., polytetrafluoroethylene)
(Component C)
C-1: Megafac F-114P (trade name) (manufactured by Dainippon Ink and Chemicals, Inc., potassium perfluorobutanesulfonate)
C-2: silicone compound produced by the following method (rational formula: $M_2 D^H_2 D_1 D^{\Phi 2}_3$, Si—H amount of 0.21 mol/100 g, aromatic group content of 49 wt %, average polymerization degree of 8.0, the symbols in the above rational formula represent the following siloxane units and the coefficients (subscripts) of the symbols represent the numbers of siloxane units in one molecule (polymerization degree).
M: $(CH_3)_3SiO_{1/2}$
$M^H$: $H(CH_3)_2SiO_{1/2}$
D: $(CH_3)_2SiO$
$D^H$: $H(CH_3)_2SiO$
$D^{\Phi 2}$: $(C_6H_5)_2SiO$
$T^\Phi$: $(C_6H_5)SiO_{3/2}$
[Production Method]
301.9 g of water and 150 g of toluene were fed to a 1-liter flask equipped with a stirrer, cooling device and thermometer and cooled to an inside temperature of 5° C. A mixture of 21.7 g of trimethylchlorosilane, 23.0 g of methyl dichlorosilane, 12.9 g of dimethyl dichlorosilane and 76.0 g of diphenyl dichlorosilane was charged into a dropping funnel and added dropwise to the flask over 2 hours under agitation. During this, cooling was continued to maintain the inside temperature at 20° C. or lower. After the end of addition, the mixture was aged by keeping stirring for 4 hours at an inside temperature of 20° C. and left to remove a separated hydrochloric acid water layer, and a 10% sodium carbonate aqueous solution was added, stirred for 5 minutes and left to remove a separated water layer. Thereafter, the residue was rinsed in ion exchange water 3 times, and it was confirmed that a toluene layer became neutral. After this toluene solution was heated at an inside temperature up to 120° C. under reduced pressure to remove toluene and a low boiling point product, insoluble matter was removed by filtration to obtain a silicone compound C-2.
C-3: phosphoric acid ester containing bisphenol A bis(diphenylphosphate) as the main component (CR-741 (trade name) of Daihachi Chemical Industry Co., Ltd.)
C-4: halogen-based flame retardant (aromatic polycarbonate oligomer obtained from tetrabromobisphenol A) (Fire Guard FG-7000 (trade name) of Teijin Chemicals Ltd.)
(Component D)
D-1: SXH330 (trade name) (ABS resin manufactured by Japan A&L Co., Ltd., butadiene rubber content of about 18 wt %, emulsion polymerization product)
D-2: AT-08 (trade name) (ABS resin manufactured by Japan A&L Co., Ltd., butadiene rubber content of about 18 wt %, bulk polymerization product)
D-3: 700FP (trade name) (polybutylene terephthalate resin manufactured by Wintec Polymer Co., Ltd.)
D-4: TR8580 (trade name) (polyethylene terephthalate resin manufactured by Teijin Ltd.)
D-5: core-shell graft copolymer (Metabrene C-223A (trade name) of Mitsubishi Rayon Co., Ltd.; graft copolymer comprising core composed of 70 wt % of polybutadiene and shell composed of styrene and methyl methacrylate, average rubber particle diameter of 270 nm)
(Others)
SL: Rikemarl SL900 (trade name) (saturated fatty acid ester-based release agent manufactured by Riken Vitamin Co., Ltd.)
EW: Rikestar EW-400 (trade name) (fatty acid ester-based release agent comprising pentaerythritol tetrastearate as the main component, manufactured by Riken Vitamin Co., Ltd.)
TMP: TMP (trade name) (phosphorus-based stabilizer manufactured by Daihachi Chemical Industry Co., Ltd.)

TABLE 1

| | | | unit | Ex. 1 | Ex. 2 | Ex. 3 | Ex. 4 | Ex. 5 |
|---|---|---|---|---|---|---|---|---|
| composition | Component A | PC-1 | pbw | 100 | 100 | 100 | 100 | 100 |
| | | PC-2 | | | | | | |
| | Component B | B-1 | | 0.1 | 0.1 | 0.1 | 0.2 | 0.6 |
| | Component B for comparison | B-2 | | | | | | |
| | | B-3 | | | | | | |
| | | B-4 | | | | | | |
| | | B-5 | | | | | | |
| | Component C | C-1 | pbw | 0.05 | | 0.05 | 0.05 | 0.05 |
| | | C-2 | | | 1.0 | 1.0 | | |
| | | C-3 | | | | | | |
| | Others | SL | pbw | | | | | |
| | | EW | pbw | 0.2 | 0.2 | 0.2 | 0.2 | 0.2 |
| | | TMP | pbw | 0.02 | 0.02 | 0.02 | 0.02 | 0.02 |
| | Heat stability | ΔMv | — | 100 | 100 | 100 | 100 | 100 |
| | Evaluation of appearance | | — | ○ | ○ | ○ | ○ | ○ |
| | Impact strength | Sharpy impact strength | KJ/m² | 50 | 45 | 45 | 43 | 21 |
| | | High-speed surface impact | J | 52 | 51 | 52 | 52 | 50 |
| | Hydrolysis resistance | ΔMv | — | 400 | 500 | 500 | 500 | 700 |
| | Flame retardancy | 1.8 mm | | V-1 | V-1 | V-0 | V-0 | V-0 |
| | | 2.0 mm | | V-0 | V-0 | V-0 | V-0 | V-0 |

TABLE 1-continued

| | | | unit | Ex. 6 | Ex. 7 | Ex. 8 | Ex. 9 | Ex. 10 |
|---|---|---|---|---|---|---|---|---|
| composition | Component A | PC-1 | pbw | 100 | 100 | 100 | 100 | |
| | | PC-2 | | | | | | 100 |
| | Component B | B-1 | | | 0.8 | 0.8 | 0.8 | 1.0 | 0.8 |
| | Component B for comparison | B-2 | | | | | | |
| | | B-3 | | | | | | |
| | | B-4 | | | | | | |
| | | B-5 | | | | | | |
| | Component C | C-1 | pbw | 0.05 | 0.05 | 0.1 | 0.05 | 0.05 |
| | | C-2 | | | | | | |
| | | C-3 | | | | | | |
| | Others | SL | pbw | | 0.2 | | | |
| | | EW | pbw | 0.2 | | 0.2 | 0.2 | 0.2 |
| | | TMP | pbw | 0.02 | 0.02 | 0.02 | 0.02 | 0.02 |
| | Heat stability | ΔMv | — | 100 | 100 | 200 | 200 | 100 |
| | Evaluation of appearance | | — | ○ | ○ | ○ | ○ | ○ |
| | Impact strength | Sharpy impact strength | KJ/m² | 19 | 19 | 19 | 18 | 18 |
| | | High-speed surface impact | J | 48 | 48 | 47 | 45 | 45 |
| | Hydrolysis resistance | ΔMv | — | 800 | 800 | 1100 | 900 | 800 |
| | Flame retardancy | 1.8 mm | — | V-0 | V-0 | V-0 | V-0 | V-0 |
| | | 2.0 mm | — | V-0 | V-0 | V-0 | V-0 | V-0 |

| | | | unit | C. Ex. 1 | C. Ex. 2 | C. Ex. 3 | C. Ex. 4 | C. Ex. 5 | C. Ex. 6 | C. Ex. 7 | C. Ex. 8 |
|---|---|---|---|---|---|---|---|---|---|---|---|
| Composition | Component A | PC-1 | pbw | 100 | 100 | 100 | 100 | | 100 | 100 | 100 |
| | | PC-2 | | | | | | 100 | | | |
| | Component B | B-1 | | | 7.5 | | | | | | |
| | Component B for comparison | B-2 | | | | 0.1 | 0.8 | 0.8 | | | |
| | | B-3 | | | | | | | 0.8 | | |
| | | B-4 | | | | | | | | 0.8 | |
| | | B-5 | | | | | | | | | 0.4 |
| | Component C | C-1 | pbw | 0.05 | 0.05 | 0.05 | 0.05 | 0.05 | 0.05 | 0.05 | 0.05 |
| | | C-2 | | | | | | | | | |
| | | C-3 | | | | | | | | | |
| | Others | SL | pbw | | | | | | | | |
| | | EW | pbw | 0.2 | 0.2 | 0.2 | 0.2 | 0.2 | 0.2 | 0.2 | 0.2 |
| | | TMP | pbw | 0.02 | 0.02 | 0.02 | 0.02 | 0.02 | 0.02 | 0.02 | 0.02 |
| | Heat stability | ΔMv | — | 100 | 200 | 100 | 100 | 100 | 100 | 100 | 100 |
| | Evaluation of appearance | | — | ○ | Δ | ○ | ○ | ○ | ○ | Δ | X |
| | Impact strength | Sharpy impact strength | KJ/m² | 60 | 8 | 47 | 17 | 16 | 16 | 15 | 14 |
| | | High-speed surface impact | J | 58 | 30 | 49 | 44 | 41 | 44 | 40 | 37 |
| | Hydrolysis resistance | ΔMv | — | 300 | 2300 | 600 | 900 | 900 | 1900 | 1000 | 1300 |
| | Flame retardancy | 1.8 mm | — | V-2 | V-0 | V-2 | V-0 | V-0 | V-0 | V-0 | V-0 |
| | | 2.0 mm | — | V-2 | V-0 | V-0 | V-0 | V-0 | V-0 | V-0 | V-0 |

Ex.: Example
C. Ex.: Comparative Example
pbw: parts by weight

TABLE 2

| | | | unit | Ex. 11 | Ex. 12 | C. Ex. 9 | C. Ex. 10 | C. Ex. 11 |
|---|---|---|---|---|---|---|---|---|
| composition | Component A | PC-1 | pbw | 100 | 100 | 100 | 100 | 100 |
| | | PC-2 | | | | | | |
| | Component B | B-1 | | 0.9 | 1.0 | | | 0.8 |
| | Component B for comparison | B-2 | | | | 0.8 | 0.8 | |
| | | B-3 | | | | | | |
| | | B-4 | | | | | | |
| | | B-5 | | | | | | |
| | Component C | C-1 | pbw | | | | | |
| | | C-2 | | | | | | |
| | | C-3 | | 11 | 25 | 10 | 25 | 35 |
| | Others | SL | pbw | 0.2 | 0.2 | 0.2 | 0.2 | 0.2 |
| | | EW | pbw | | | | | |
| | | TMP | pbw | 0.02 | 0.02 | 0.02 | 0.02 | 0.02 |
| | Heat stability | ΔMv | — | 200 | 400 | 200 | 600 | 1000 |

TABLE 2-continued

|  |  | unit | Ex. 11 | Ex. 12 | C. Ex. 9 | C. Ex. 10 | C. Ex. 11 |
|---|---|---|---|---|---|---|---|
| Evaluation of appearance |  | — | ○ | ○ | ○ | ○ | ○ |
| Impact strength | Sharpy impact strength | KJ/m$^2$ | 14 | 12 | 12 | 8 | 5 |
|  | High-speed surface impact | J | 34 | 32 | 28 | 28 | 10 |
| Hydrolysis resistance | ΔMv | — | 1300 | 2000 | 1600 | 3000 | 3500 |
| Flame retardancy | 1.8 mm | — | V-0 | V-0 | V-0 | V-0 | V-0 |
|  | 2.0 mm | — | V-0 | V-0 | V-0 | V-0 | V-0 |

Ex.: Example
C. Ex.: Comparative Example
pbw: parts by weight

TABLE 3

|  |  |  | unit | Ex. 13 | Ex. 14 | C. Ex. 12 | Ex. 15 | C. Ex. 13 |
|---|---|---|---|---|---|---|---|---|
| composition | Component A | PC-1 | pbw | 100 | 100 | 100 | 100 | 100 |
|  |  | PC-2 |  |  |  |  |  |  |
|  | Component B | B-1 |  | 1.0 | 1.0 |  | 0.7 |  |
|  | Component B for comparison | B-2 |  |  |  | 1.0 |  | 0.7 |
|  | Component C | C-3 | pbw | 18 | 18 | 18 |  |  |
|  |  | C-4 |  |  |  |  | 11 | 11 |
|  | Component D | D-1 | pbw | 20 |  | 20 |  |  |
|  |  | D-2 |  |  | 20 |  |  |  |
|  |  | D-3 |  |  |  |  | 6 | 6 |
|  |  | D-4 |  |  |  |  | 17 | 17 |
|  |  | D-5 |  | 2 | 2 | 2 |  |  |
|  | Others | SL | pbw | 0.3 | 0.3 | 0.3 | 0.3 | 0.3 |
|  |  | TMP | pbw | 0.02 | 0.02 | 0.02 | 0.02 | 0.02 |
| Heat stability | ΔMv |  | — | 500 | 400 | 700 | 500 | 700 |
| Evaluation of appearance |  |  | — | ○ | ○ | ○ | ○ | ○ |
| Impact strength | Sharpy impact strength |  | KJ/m$^2$ | 15 | 15 | 13 | 34 | 29 |
|  | High-speed surface impact |  | J | 36 | 35 | 31 | 24 | 19 |
| Hydrolysis resistance | ΔMv |  | — | 1800 | 1600 | 2000 | 1400 | 1600 |
| Flame retardancy | 2.0 mm |  | — | V-0 | V-0 | V-0 | V-0 | V-0 |

Ex.: Example
C. Ex.: Comparative Example
pbw: parts by weight

As obvious from Tables 1 to 3, the resin composition of the present invention is excellent in flame retardancy, appearance and impact strength as well as heat stability, hydrolysis resistance and drip prevention properties.

EFFECT OF THE INVENTION

The polymer mixture (component B) suppresses the secondary agglomeration of polytetrafluoroethylene to improve its dispersibility, thereby improving the impact strength of the obtained molded article. Since the polymer mixture (component B) is produced by suspension polymerization without using an emulsifier containing a metal such as Na or K, the hydrolysis resistance of the molded article is improved.

Therefore, the resin composition of the present invention provides a molded article which is excellent in flame retardancy, appearance, impact strength, heat stability, hydrolysis resistance and drip prevention properties. According to the production method of the resin composition of the present invention, the resin composition can be produced. According to the method of improving the impact strength of the molded article of the present invention, a molded article having excellent impact strength and hydrolysis resistance can be obtained.

INDUSTRIAL FEASIBILITY

The resin composition of the present invention is useful in application fields such as electronic and electric appliances, OA equipment, car parts, mechanical parts, agricultural materials, shipping containers, play tools and miscellaneous goods.

The invention claimed is:

1. A resin composition comprising (A) 100 parts by weight of an aromatic polycarbonate resin (component A), (B) 0.01 to 6 parts by weight of a polymer mixture (component B) obtained by suspension polymerizing a styrene monomer, a maleic anhydride monomer and an acrylic monomer in the presence of polytetrafluoroethylene particles, and (C) 0.01 to 30 parts by weight of a flame retardant (component C).

2. The resin composition according to claim 1, wherein a recurring unit derived from the styrene monomer of the component B has a structure represented by the following formula (1):

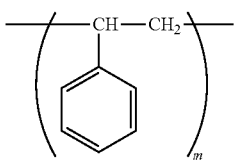

(in the formula (1), m is an integer of 1 to 2,000).

3. The resin composition according to claim 1, wherein a recurring unit derived from the maleic anhydride monomer of the component B has a structure represented by the following formula (2):

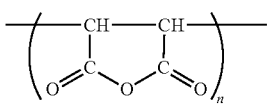

(in the formula (2), n is an integer of 1 to 2,000).

4. The resin composition according to claim 1, wherein a recurring unit derived from the acrylic monomer of the component B has a structure represented by the following formula (3):

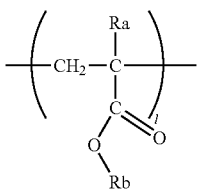

(in the formula (3), Ra is a hydrogen atom or alkyl group having 1 to 3 carbon atoms, Rb is a hydrogen atom or alkyl group having 1 to 3 carbon atoms, and l is an integer of 1 to 2,000).

5. The resin composition according to claim 4, wherein the recurring unit derived from the acrylic monomer of the component B has a structure represented by the following formula (3-1):

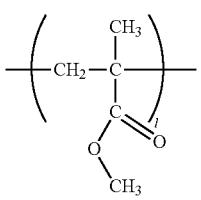

(in the formula (3-1), l is an integer of 1 to 2,000).

6. The resin composition according to claim 1, wherein the component C is at least one flame retardant selected from the group consisting of an organic metal salt-based flame retardant and a silicone-based flame retardant.

7. The resin composition according to claim 6, wherein the organic metal salt-based flame retardant is an organic sulfonic acid alkali (earth) metal salt.

8. The resin composition according to claim 7, wherein the organic sulfonic acid alkali (earth) metal salt is a perfluoroalkylsulfonic acid alkali (earth) metal salt.

9. The resin composition according to claim 6, wherein the silicone-based flame retardant is a silicone compound having an Si—H group and an aromatic group in the molecule, (i) the content of the Si—H group (the amount of Si—H) is 0.1 to 1.2 mol/100 g, (ii) the content of the aromatic group (the amount of the aromatic group) represented by the following formula (4) is 10 to 70 wt %, and (iii) the average polymerization degree is 3 to 150:

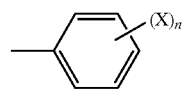

(in the formula (4), X's are each independently an OH group or hydrocarbon group having 1 to 20 carbon atoms which may have a heteroatom-containing functional group, and n is an integer of 0 to 5, with the proviso that when n is 2 or more in the formula (4), X's may be different from one another).

10. The resin composition according to claim 6, wherein the silicone-based flame retardant satisfies all of the following relational expressions when it has siloxane units M, $M^H$, D, $D^H$, $D^{\Phi 2}$, T and $T^\Phi$ (M: $(CH_3)_3SiO_{1/2}$, $M^H$: $H(CH_3)_2SiO_{1/2}$, D: $(CH_3)_2SiO$, $D^H$: $H(CH_3)SiO$, $D^{\Phi 2}$: $(C_6H_5)_2SiO$, T: $(CH_3)SiO_{3/2}$, $T^\Phi$: $(C_6H_5)SiO_{3/2}$) and the average numbers of the siloxane units per molecule are represented by m, $m_h$, d, $d_h$, $d_{p2}$, t and $t_p$, respectively:

$2 \leq m+m_h \leq 40$ $0.35 \leq d+d_h+d_{p2} \leq 148$ $0 \leq t+t_p \leq 38$ $0.35 \leq m_h+d_h \leq 110$.

11. The resin composition according to claim 1 which comprises (D) 1 to 50 parts by weight of a thermoplastic resin (component D) except for the aromatic polycarbonate resin based on 100 parts by weight of the component A.

12. The resin composition according to claim 11, wherein the component D is a polyester resin and/or ABS resin.

13. A molded article obtained from the resin composition of claim 1.

14. A method of producing a resin composition, comprising mixing together (A) 100 parts by weight of an aromatic polycarbonate resin (component A), (B) 0.01 to 6 parts by weight of a polymer mixture (component B) obtained by suspension polymerizing a styrene monomer, a maleic anhydride monomer and an acrylic monomer in the presence of polytetrafluoroethylene particles, and (C) 0.01 to 30 parts by weight of a flame retardant (component C).

15. A method of improving the impact strength of a molded article of a resin composition comprising an aromatic polycarbonate resin, polytetrafluoroethylene particles and a flame retardant, wherein a polymer mixture obtained by suspension polymerizing a styrene monomer, a maleic anhydride monomer and an acrylic monomer in the presence of polytetrafluoroethylene particles is used as the polytetrafluoroethylene particles.

* * * * *